Figure 1:
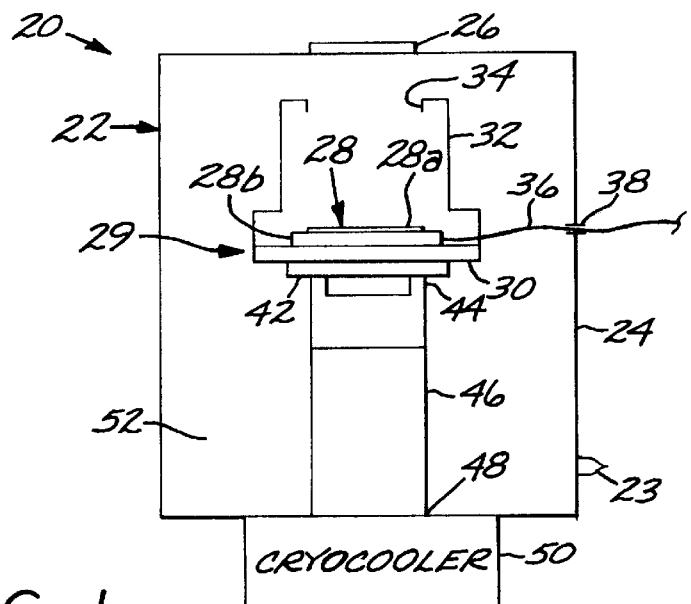

United States Patent

Patel et al.

[11] Patent Number: 6,122,919
[45] Date of Patent: Sep. 26, 2000

[54] SENSOR/COOLING SYSTEM WITH COLD FINGER HAVING RECESSED END

[75] Inventors: Monesh S. Patel; George K. Papazacharioudakis, both of Goleta; Steven L. Bailey, Ventura, all of Calif.

[73] Assignee: Raytheon Company, Lexington, Mass.

[21] Appl. No.: 09/337,935

[22] Filed: Jun. 22, 1999

[51] Int. Cl.[7] ..................................................... F25B 19/00
[52] U.S. Cl. ............................................. 62/51.1; 250/352
[58] Field of Search .................... 62/51.1, 51.2; 250/352

[56] References Cited

U.S. PATENT DOCUMENTS 4,118,947 10/1978 Diedrich et al. ........................ 62/51.1
4,194,119 3/1980 MacKenzie .............................. 250/352
4,870,830 10/1989 Hohenwarter et al. .................. 62/51.1
4,873,843 10/1989 Volten ..................................... 250/352

*Primary Examiner*—Ronald Capossela
*Attorney, Agent, or Firm*—William C. Schubert; Glenn H. Lenzen, Jr.

[57] ABSTRACT

A sensor/cooling system (20) includes a cold finger (46) with an endcap (54) having an end projection (56) at a first end (44) thereof. The end projection (56) defines a recess (58) in an end of the endcap (54), preferably along a longitudinal centerline (60) of the cold finger (46). A support structure (29) has a platform (30) with a first side (40) and a second side (42) oppositely disposed from the first side (40). The second side (42) is affixed to the end projection (56) of the endcap (54) so as to overlie the recess (58). A sensor assembly (28) is affixed to the first side (40) of the platform (30), a cryogenic cooler (50) is affixed to a second end (48) of the cold finger (46), and a vacuum housing (24) encloses at least the sensor assembly (28).

15 Claims, 2 Drawing Sheets

SENSOR/COOLING SYSTEM WITH COLD FINGER HAVING RECESSED END

This invention was made with government support under contract No. F33657-96-C-6134 by the Department of the Air Force. The Government has certain rights in this invention.

BACKGROUND OF THE INVENTION

This invention relates to sensor systems that are cooled during service, and, more particularly, to a structure that reduces "heartbeat" noise reaching the sensor and appearing in the sensor output signal.

A sensor assembly receives radiated energy from a scene, and converts that energy into electrical signals for display and/or analysis. Many infrared and other types of sensor assemblies operate most efficiently and reliably when cooled to a cryogenic temperature, such as about the boiling point of liquid nitrogen, 77K, and are operated in a vacuum to provide thermal insulation for the sensor assembly and to avoid condensation of materials such as water on the sensor assembly. To effect these conditions in service, the sensor assembly is mounted on a platform supported on a hollow tube termed a "cold finger", and within an evacuated dewar/vacuum enclosure. The dewar/vacuum enclosure typically includes an insulated vacuum housing having a window through which the sensor views an external scene.

When the sensor is to be used in service, the opposite end of the cold finger is cooled by a cooling device, causing heat to flow out of the cold finger, the platform, and the sensor assembly. After the sensor assembly reaches the required reduced operating temperature, it becomes operational.

When the sensor is operated, the image produced by the sensor output signal is typically degraded by a periodic type of noise termed "heartbeat". The sensor is operable even in the presence of the heartbeat noise, but the resulting image is either used in a degraded form or must be digitally processed to reduce the heartbeat noise. Digital processing utilizes computer resources that are otherwise better used elsewhere, and slows the processing of the image.

There is a need for identifying the source of the heartbeat noise, and reducing or eliminating the heartbeat noise from the sensor output signal. The present invention fulfills this need, and further provides related advantages.

SUMMARY OF THE INVENTION

The present invention provides a sensor/cooling system having reduced heartbeat noise, as compared with conventional systems. The reduction of the heartbeat noise is achieved by a change in hardware design, conserving digital processing resources and permitting faster processing of the image output signal of the sensor.

In accordance with the invention, a sensor/cooling system comprises a cold finger and a support structure comprising a platform having a first side and a second side oppositely disposed from the first side. The second side of the platform is affixed to a first end of the cold finger. A sensor assembly is affixed to the first side of the platform, and a cryogenic cooler is affixed to the second end of the cold finger. A deformation isolator mechanically isolates the sensor assembly from deformation pulses introduced at the second end of the cold finger. In a preferred embodiment, the cold finger comprises an endcap having an end projection at a first end thereof, which end projection defines a recess in an end of the endcap. The second side of the platform is affixed to the end projection of the endcap so as to overlie the recess.

The present invention is based upon the discovery that the source of the heartbeat noise is related to periodic pressure pulses produced by the cryogenic cooler. The pressure pulses generated within the cryogenic cooler are transmitted to the sensor through the endcap, and primarily its central portion. In the present invention, the deformation isolator mechanically isolates the sensor assembly from the deformation pulses introduced into the cold finger from the cryogenic cooler.

The result is reduced deformation of the sensor assembly, and consequently reduced heartbeat noise in the output signal of the sensor.

Thus, the mechanical isolation of the sensor assembly from the cold finger and the cryogenic cooler reduces the heartbeat noise of the sensor output signal substantially. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic sectional view of a dewar/vacuum enclosure;

FIG. 2 is an enlarged detail of FIG. 1; and

FIG. 3 is a graph comparing strain and digitization noise for a conventional approach and for the present approach.

DETAILED DESCRIPTION OF THE INVENTION

FIG. 1 depicts a sensor/cooling system 20 including a dewar body 22, also termed a vacuum housing, whose interior is evacuated prior to service through an evacuation line 23 that is tipped off and sealed, and remains evacuated during service. The dewar body 22 has vacuum housing walls 24 with a window 26 in one of the walls 24. A sensor assembly 28 is affixed to a support structure 29, which includes a one-piece platform 30, in facing relationship to the window 26. The sensor assembly 28 typically includes a planar radiation detector **28*a* and a readout circuit 28*b* joined to the radiation detector 28*a*. A metal cold shield 32 is positioned laterally adjacent to the sensor assembly 28, to prevent extraneous radiation from reaching the sensor assembly 28. The cold shield 32 has an opening 34 therethrough in a line of sight between the sensor assembly 28 and the window 26, so that the sensor assembly faces an external scene through the window 26 and the opening 34. The sensor assembly 28 is connected to external instrumentation (not shown) by wires 36 and a feedthrough 38 extending through the wall 24. The material of construction of the window 26 is selected to transmit radiation of the wavelength sensed by the sensor assembly 28, and such windows and window materials are well known in the art for various wavelengths of interest. The construction of the sensor assembly 28** is also well known in the art.

The sensor assembly 28 operates most efficiently at reduced temperatures, with the majority of applications at about 77K, the boiling point of liquid nitrogen. To cool the sensor assembly 28 to that temperature, it is affixed onto a first side 40 of the platform 30. The sensor assembly 28 is affixed to the platform 30 by any operable approach, most preferably with a suitable adhesive. An oppositely disposed second side 42 of the platform 30 is bonded to a first end 44 of a hollow, generally cylindrical cold finger 46. The cold finger 46 supports the platform 30 and thence the sensor assembly 28. A second end 48 of the cold finger 46, opposite from the first end 44, is cooled by a cryocooler 50 in any operable fashion, such as contact with cold gas and/or a liquefied gas such as liquid nitrogen, or a mechanical cooler. When the cryocooler 50 is operated, heat is removed from the cold finger 46, and thence from the platform 30 and the sensor assembly 28 to cool the sensor assembly 28 to its operating temperature. A vacuum space 52 within the walls 24 but outside the interior of the volume defined by the cold finger 46 is evacuated to prevent condensation on the sensor assembly 28 and to reduce heat loss.

Figure 2:
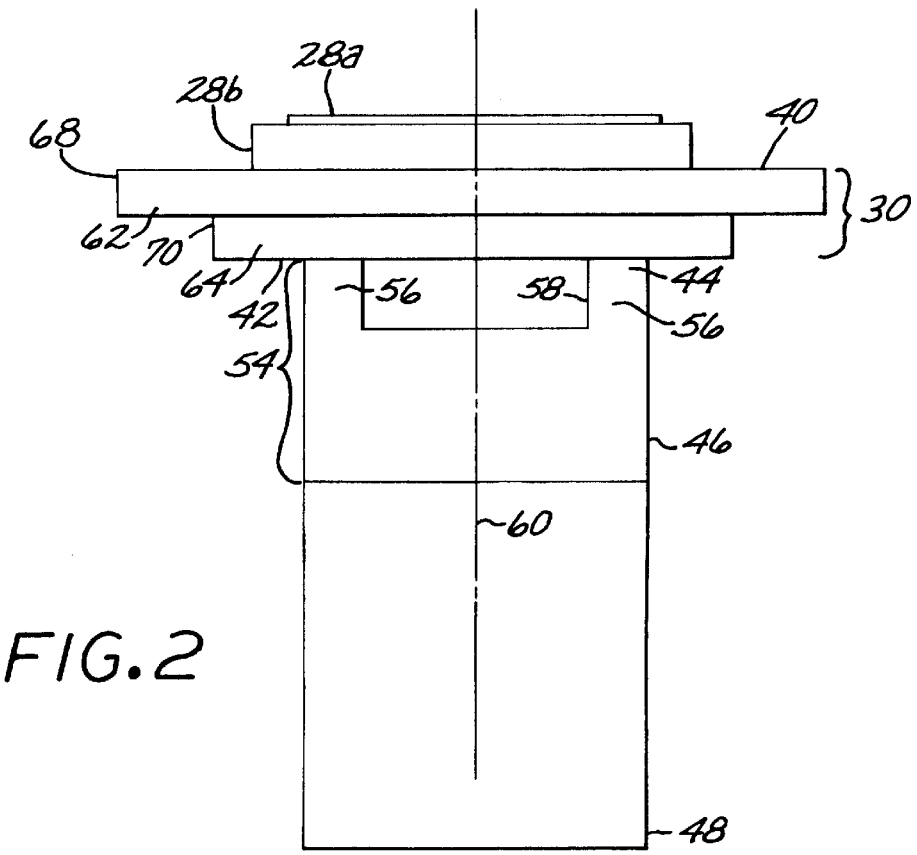

FIG. 2 illustrates a portion of the sensor/cooling system in greater detail. The first end 44 of the cold finger 46 is a region termed an end cap 54. The end cap 54 has an end projection 56 defining a recess 58 in the first end 44. The projection 56 is desirably in the form of an annular rim extending around the circumference of the first end 44 of the generally cylindrical cold finger 46, and extending parallel to a longitudinal centerline 60 of the cold finger 46. In this preferred approach, the recess 58 is centrally located at the longitudinal centerline 60 and is axisymmetric about the longitudinal centerline 60.

The second side 42 of the platform 30 is affixed to the axially facing side of the end projection 56 of the end cap 54. The affixing of the platform 30 to the end projection 56 is accomplished by any operable approach, preferably with a suitable adhesive.

The platform 30 is preferably a one-piece structure but having a first region 62 and a second region 64. The first side 40 of the platform 30 is the upwardly facing side of the first region 62, so that the sensor assembly 28 is joined to the first region 62. The second side 42 of the platform 30 is the downwardly facing side of the second region 64, so that the cold finger 46 is joined to the second region 64. An outer periphery 68 of the first region 62 is further from the longitudinal centerline 60 than is an outer periphery 70 of the second region 64. Stated equivalently, the first region 62 has a larger lateral extent than the second region 64. Preferably, the platform 30 is made of aluminum oxide ($Al_2O_3$) and the end cap 54 is made of an invar alloy such as a nickel/iron alloy having a composition of 39 weight percent nickel, balance iron.

The structure of the invention provides a deformation isolator which mechanically isolates the sensor assembly 28 from deformation pulses introduced at the second end 48 of the cold finger 46 by the cryocooler 50. The inventors have determined that the "heartbeat noise" observed in the output signal of the sensor assembly 28 originates in the pressure pulses of the cryocooler 50, which are transmitted into and through the cold finger 46 and the platform 30, and thence into the sensor assembly 28, as deformation pulses. The deformation pulses are greatest along the longitudinal centerline 60 in the conventional approach, so that removing the material of the central portion of the endcap 54 by virtue of the central recess 58 greatly reduces the magnitude of the deformation pulse energy reaching the sensor assembly 28. The weight of the structure is not increased, and in fact is slightly decreased. The projection/recess structure at the first end 44 of the cold finger 46 thus reduces the "heartbeat noise" by isolating the sensor assembly 28 from the source of the heartbeat noise, the cryocooler 50.

Figure 3:
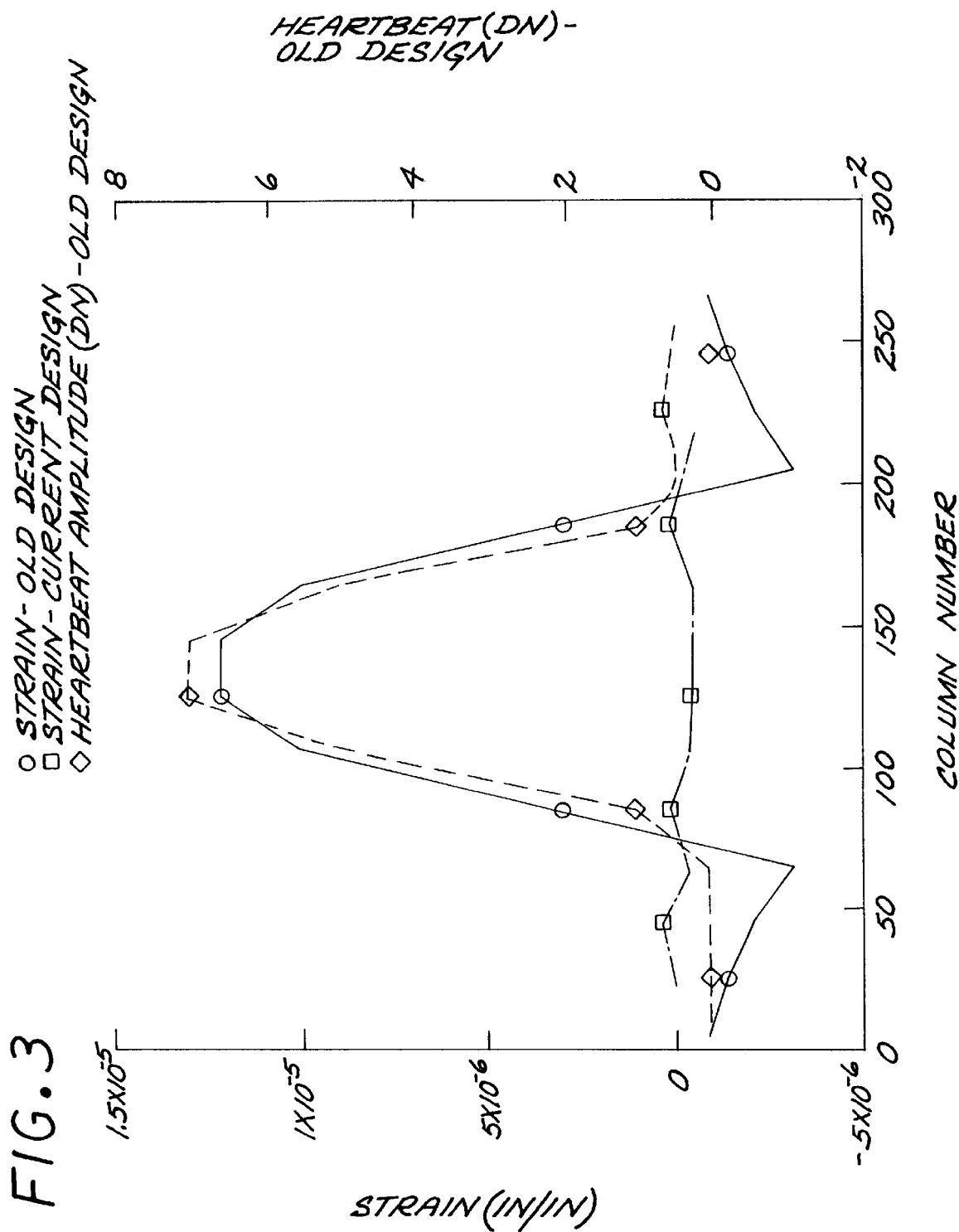

The heartbeat noise may be expressed in terms of a digitization noise (DN). FIG. 3 is a plot of strain and measured digitization noise as a function of the location of the measurement (the column number) across the lateral width of the sensor assembly 28. Data is presented for both a conventional ("old design") platform with a flat end cap, and for the "current design" of the invention with the platform 30 and a recessed end cap 54. With the old-design approach, the measured heartbeat amplitude in the digitization noise output signal of the sensor assembly (diamond symbols, right-hand scale) follows the shape and amplitude of the measured strain amplitude (circle symbols, left-hand scale). The heartbeat amplitude in the old design with a flat end cap is a maximum near the longitudinal centerline 60. With the current design, the end cap with the hollowed-out (recessed) end cap has no path by which the large strain deformation along the centerline may reach the sensor assembly 28. Consequently, the measured strain amplitude (square symbols, left-hand scale) across the entire width of the sensor assembly 28 of the present approach is very near to zero, and there was essentially no measurable heart beat digitization noise in the sensor output. Thus, the problem of heartbeat noise is overcome by a change in the mechanical design of the end cap. The electronic processing to remove heartbeat noise in the electrical output of the sensor assembly is either not required or is greatly reduced as compared with the prior approach.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sensor/cooling system, comprising:
   a cold finger comprising
   an endcap having an end projection at a first end thereof, the end projection defining a recess in an end of the endcap;
   a support structure comprising
   a platform having a first side and a second side oppositely disposed from the first side, the second side being affixed to the end projection of the endcap so as to overlie the recess; and
   a sensor assembly affixed to the first side of the platform.

2. The sensor/cooling system of claim 1, wherein the recess is centrally located on the endcap and is axisymmetric about a longitudinal centerline of the cold finger.

3. The sensor/cooling system of claim 1, wherein the sensor assembly comprises
   a radiation detector, and
   a readout circuit joined to the radiation detector.

4. The sensor/cooling system of claim 1, wherein the platform is a one-piece structure.

5. The sensor/cooling system of claim 1, wherein the platform comprises
   a first region having the first side thereon, and
   a second region having the second side thereon.

6. The sensor/cooling system of claim 5, wherein the first region has a larger lateral extent than does the second region.

7. The sensor/cooling system of claim 1, wherein the end cap comprises a nickel-iron alloy.

8. The sensor/cooling system of claim 1, further including
   a vacuum housing enclosing at least the sensor assembly.

9. The sensor/cooling system of claim 1, further including
   a cryogenic cooler affixed to a second end of the cold finger.

10. A sensor/cooling system, comprising:

a cold finger comprising
an endcap having an end projection at a first end thereof, the end projection defining a recess in an end of the endcap, and a second end oppositely disposed from the first end;
a support structure comprising a one-piece platform having a first side and a second side oppositely disposed from the first side, the second side being affixed to the end projection of the endcap so as to overlie the recess;
a sensor assembly affixed to the first side of the platform;
a cryogenic cooler affixed to the second end of the cold finger; and
a vacuum housing enclosing at least the sensor assembly.

11. The sensor/cooling system of claim 10, wherein the recess is centrally located on the endcap and is axisymmetric about a longitudinal centerline of the cold finger.

12. The sensor/cooling system of claim 10, wherein the end cap comprises a nickel-iron alloy.

13. A sensor/cooling system, comprising:

a cold finger having a first end and a second end;
a support structure comprising
a platform having a first side and a second side oppositely disposed from the first side, the second side being affixed to the first end of the cold finger;
a sensor assembly affixed to the first side of the platform;
a cryogenic cooler affixed to the second end of the cold finger; and
a deformation isolator mechanically isolating the sensor assembly from deformation pulses introduced at the second end of the cold finger.

14. The sensor/cooling system of claim 13, wherein the deformation isolator comprises
an endcap at the first end of the cold finger, the endcap having an end projection at a first end thereof, the end projection defining a recess in an end of the endcap, and wherein the second side of the platform is affixed to the end projection of the endcap so as to overlie the recess.

15. The sensor/cooling system of claim 13, wherein the recess is centrally located on the endcap and is axisymmetric about a longitudinal centerline of the cold finger.

* * * * *